April 19, 1966     R. RAMSEYER     3,246,565
DEVICES FOR FEEDING AMMUNITION TO AUTOMATIC
GUNS BY MEANS OF CARTRIDGE BELTS
Filed Aug. 7, 1963     4 Sheets-Sheet 1

April 19, 1966    R. RAMSEYER    3,246,565
DEVICES FOR FEEDING AMMUNITION TO AUTOMATIC
GUNS BY MEANS OF CARTRIDGE BELTS
Filed Aug. 7, 1963    4 Sheets-Sheet 2
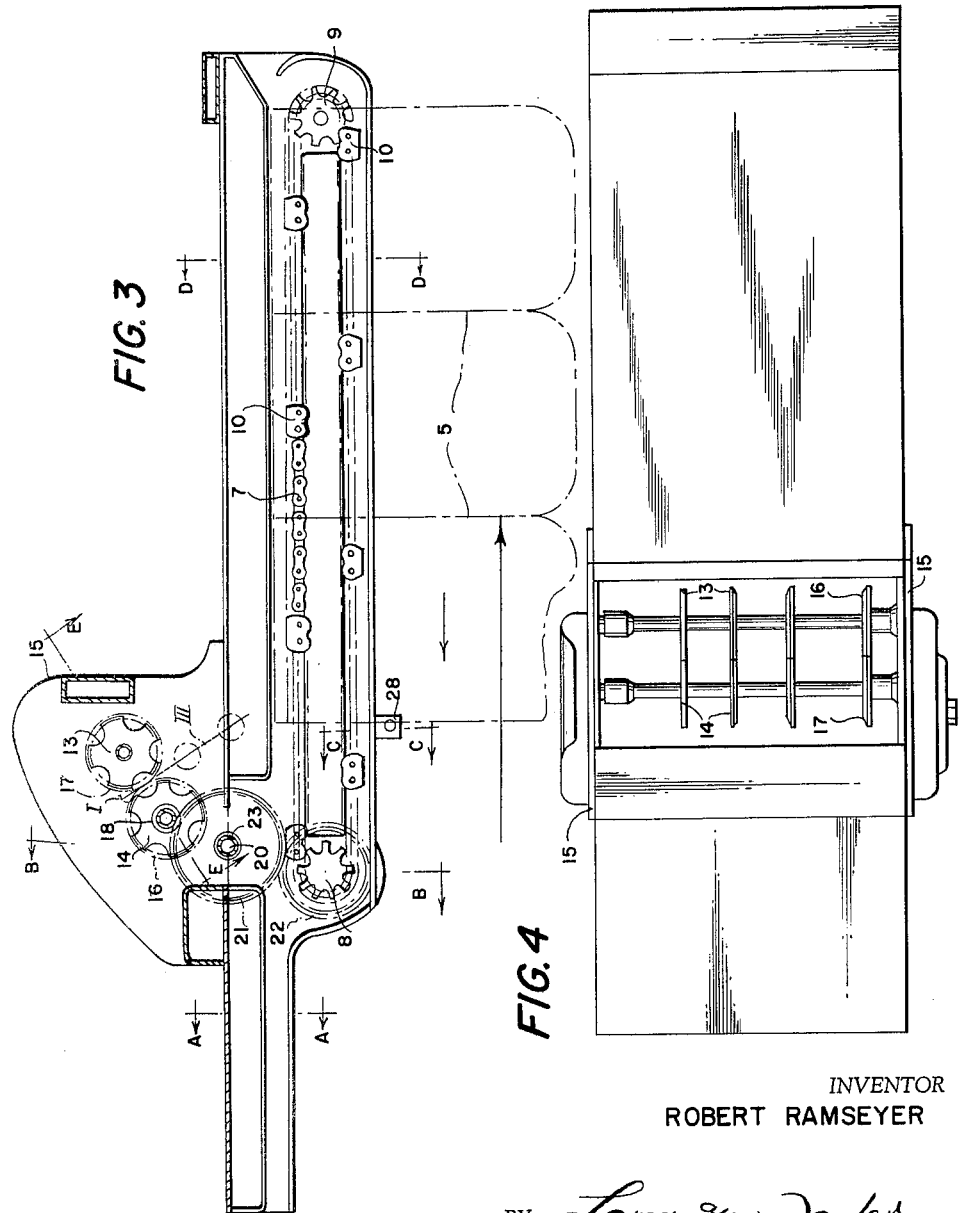
INVENTOR
ROBERT RAMSEYER
BY *Larson and Taylor*
ATTORNEYS April 19, 1966  R. RAMSEYER  3,246,565
DEVICES FOR FEEDING AMMUNITION TO AUTOMATIC
GUNS BY MEANS OF CARTRIDGE BELTS
Filed Aug. 7, 1963  4 Sheets-Sheet 3

INVENTOR
ROBERT RAMSEYER

BY *Larson and Taylor*
ATTORNEYS

April 19, 1966    R. RAMSEYER    3,246,565
DEVICES FOR FEEDING AMMUNITION TO AUTOMATIC
GUNS BY MEANS OF CARTRIDGE BELTS
Filed Aug. 7, 1963    4 Sheets-Sheet 4
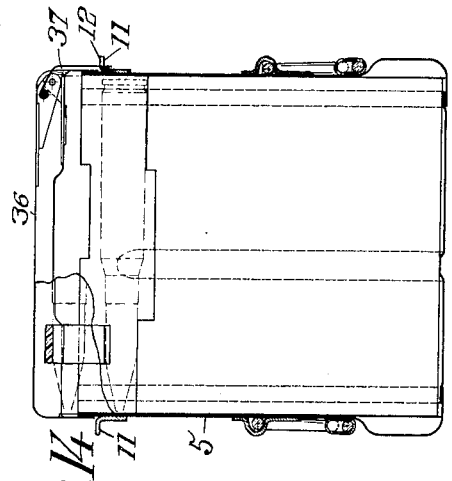
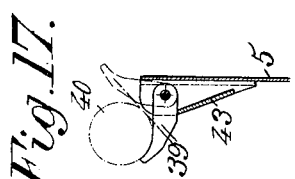
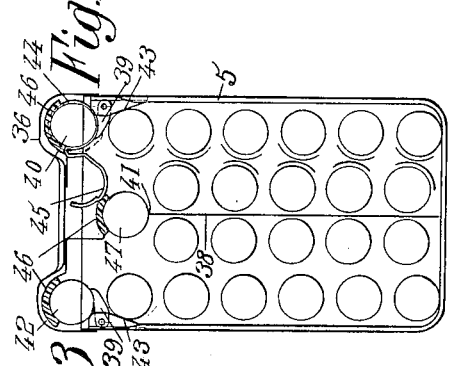
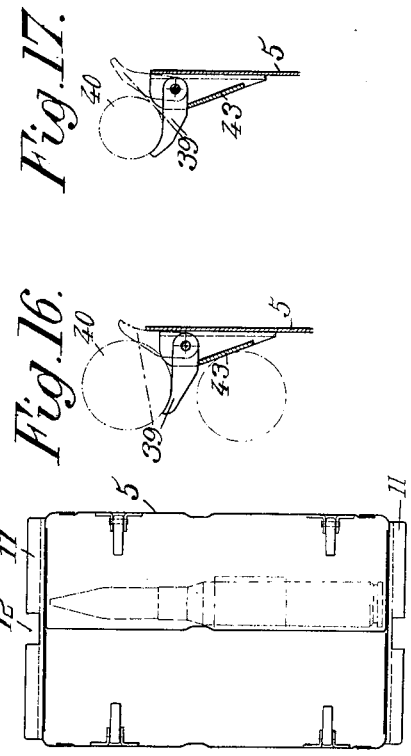
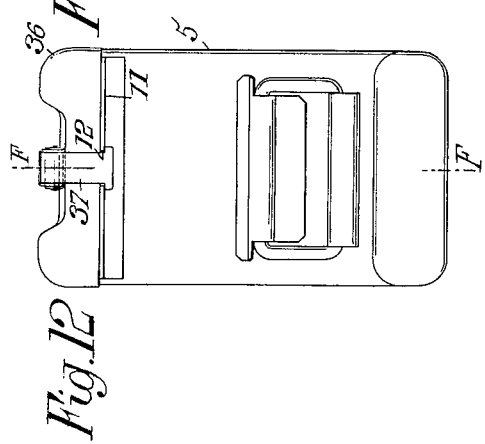
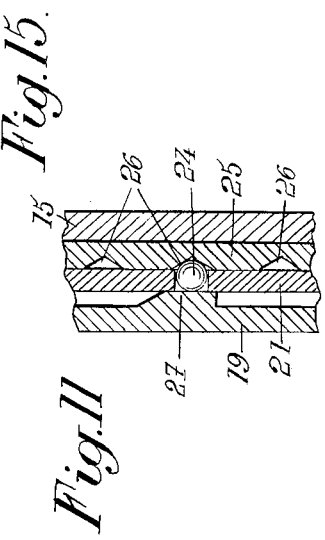

United States Patent Office 3,246,565
Patented Apr. 19, 1966

3,246,565
DEVICES FOR FEEDING AMMUNITION TO AUTOMATIC GUNS BY MEANS OF CARTRIDGE BELTS
Robert Ramseyer, Versoix, Geneva, Switzerland, assignor to Brevets Aero-Mecaniques S.A., Geneva, Switzerland, a societe of Switzerland
Filed Aug. 7, 1963, Ser. No. 300,533
Claims priority, application Luxembourg, Aug. 11, 1962, 42,204
6 Claims. (Cl. 89—33)

The present invention relates to devices for feeding ammunition to an automatic gun by means of cartridge belts and it is more specially but not exclusively concerned with devices to be used with guns supported by a mount resting upon a fixed base.

Up to this time, cartridge belts were delivered to the user in the form of portions each disposed in a box serving to its transportation. These boxes were carried to a point close to the gun mount and the cartridge belt portions were extracted therefrom, secured to one another and disposed in a utilization box located near the gun mount. The belt was then engaged into a belt feed mechanism. When, after firing, the box was emptied it was necessary either to fill it with a new cartridge belt or to replace it by another box prepared in advance. It was very difficult to secure a new belt portion to that present in a box already used. All these operations were delicate to perform on the battlefield and wasted a great lot of time during which a gun could not be used for fighting purposes. On the other hand the cartridge belt portions risked being soiled with mud, sand or snow.

The object of the present invention is to provide a feed device which is free from these drawbacks.

For this purpose, the device according to this invention comprises means for moving forward, during firing, in proximity to the gun, a succession of cartridge boxes, each containing a portion of the cartridge belt disposed therein in such a manner that by pulling upwardly the front end of a cartridge belt portion contained in any box it is possible gradually to extract these belt portions from this box, the belt portion contained in the respective boxes being each connected by its front end to the rear end of the belt portion contained in the preceding box and the boxes being displaced along a path such that each of them passes in its turn relatively to the gun into a region such that the feed of the gun can be ensured from the box present in this region, after which the empty box is eliminated.

A preferred embodiment of my invention will be hereinafter described with reference to the appended drawings and given merely by way of example, and in which:

FIG. 3 is a side view on a larger scale of the feed device mechanism according to the present invention;

FIG. 4 is a plan view according to FIGURE 3;

FIG. 11 is an explanatory view on a scale larger than that of FIG. 6;

FIG. 12 is a side view, on a scale still larger than that of FIG. 3; of a cartridge belt made according to the present invention and to be used in the mechanism shown by FIGS. 3 to 10;

Figure 1:
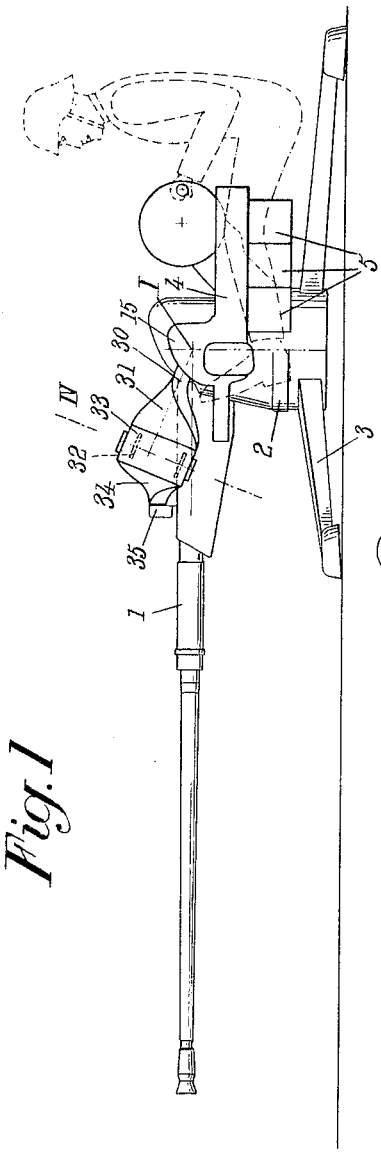
FIG. 1 is a diagrammatic side view of a gun supported by a mount including a circular plate rotatable about a vertical axis with respect to a fixed base, said gun being provided withh cartridge feeding means according to the present invention.
Figure 2:
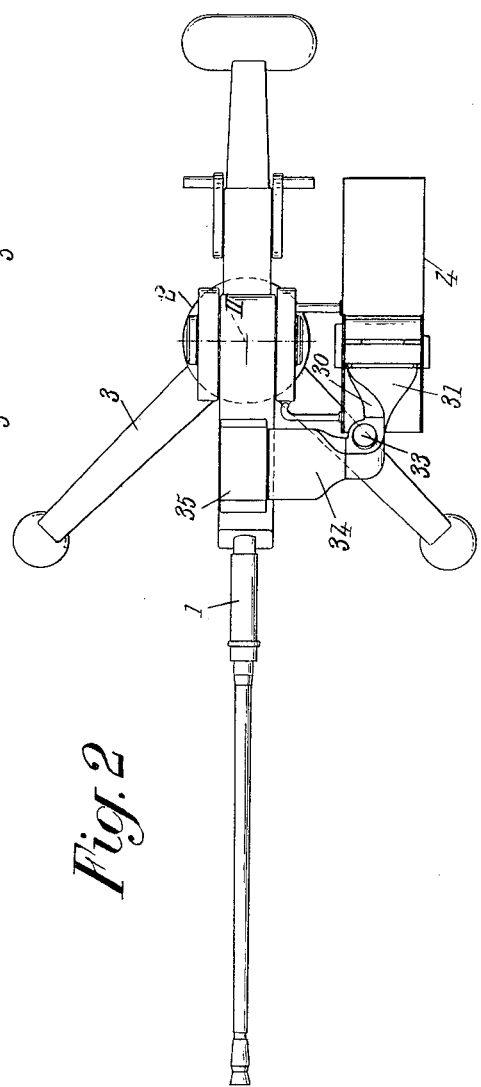
FIG. 2 is a plan view corresponding to FIGURE 1.
Figure 5:
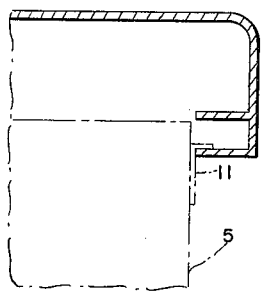
FIG. 5 is a sectional view on the line A—A of FIGURE 3.
Figure 6:
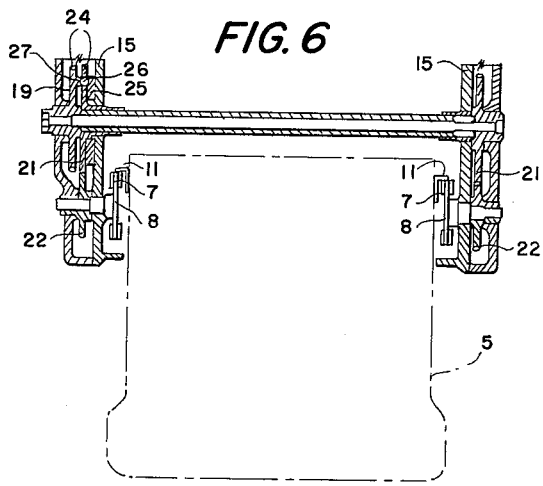
FIGS. 6, 7, 8, 9 are sectional views on the lines B—B, C—C, D—D, E—E of FIG. 3, respectively.

FIG. 13 is a sectional view corresponding to FIG. 12;
FIG. 14 is a sectional view on a line F—F of FIG. 12;
FIG. 15 is a sectional view corresponding to FIG. 12;
FIGS. 16 and 17 show, on a still larger scale, some details of the box of FIGURES 12 to 15.

The present invention relates to the case of an automatic gun 1 carried by a circular plate 2 on which it is pivotable about a horizontal axis I, said circular plate 2 being rotatable about a vertical axis II and belonging to a mount resting on the ground through a fixed base 3.

Circular plate 2 carries a frame 4 guiding, along a predetermined path, a succession of cartridge boxes 5 each of which contains a portion of the cartridge belt.

This path is such that each of said boxes passes successively into a region Z such that the gun can be fed with ammunitions from the box located in this region Z.

The path in question may be of any suitable shape so that, once a box has been emptied, and when it is to leave said region Z, it is eliminated, while another box full of cartridges can be placed after a box already engaged along said path.

This path may for instance consist of an arc of a closed curve such as a horizontal circle, in which case a rotary horizontal plate may be provided on the side of the gun, on the periphery of which would be placed the successive boxes which would pass, one after the other, through region Z, where they would be emptied due to the firing of the gun.

But it seems more advantageous to make said path substantially rectilinear in a direction parallel to the gun, boxes 5 preferably moving from the rear toward the front with respect to the gun. In the drawings the boxes move from the right toward the left. Such a solution will be now described with reference to the drawings.

Frame 4 is in the form of a parallelepipedal casing, the lower, front, and rear faces of which are open, the elongated opening thus provided under said frame permitting the passage of boxes 5 disposed in such manner that the cartridges present therein have their respective axes parallel to axis I.

On each of the inner faces of the side walls of frame 4 is fixed a horizontal rail 6, the length of which is for instance greater than the total length of three juxtaposed boxes 5. Each of these rails 6 guides the upper portion of an endless chain 7 extending between two pinions 8 and 9 journalled in frame 4, respectively at the front and at the rear of the corresponding rail 6. This chain 7 carries, at a distance from each other equal to the length of the box, driving lugs 10 projecting upwardly from the chain.

Every box 5 carries at the top and on each of its external faces perpendicular to the direction of the cartridges an edge 11 provided, for instance at its middle point, with a notch 12 adapted to engage one of said driving lugs 10. Of course the horizontal distance between edges 11 is equal to the distance between rails 6.

With such an arrangement, boxes 5 can be engaged in frame 4 from the rear in such manner that their edges 11 rest upon the upper portion of chain 7, which bears upon rails 6 respectively.

Three boxes 5, may just be placed adjacent each other on the path of travel of the upper portion of chain 7 so that these boxes move simultaneously when the chain moves in the suitable direction. Of course the box disposed at the front is that which is being emptied of its cartridges.

Figure 10:
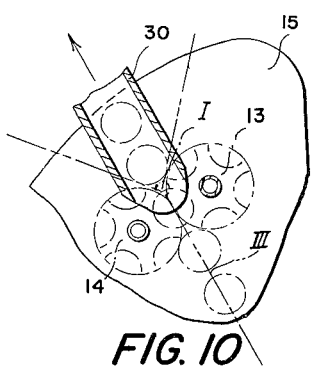
FIG. 10 is a part section in a plane parallel to that of FIG. 3.

Preferably, the path (in side view) followed, when leaving frame 4, by the middle plane III of the cartridge belt (the cartridges being then still disposed as they are in boxes 5, that is to say with their axes parallel to axis I) always passes through axis I, as visible on FIGURES 3 and 10. Thus whatever be the aiming elevation of the gun nothing will be changed in what takes place for the belt upstream of axis I.

In order to compel the middle plane III of the belt always to pass, downstream of the box that is being emptied, through axis I, I make use of two toothed rotors 13, 14, adapted to cooperate so as successively to guide every cartridge issuing from frame 4 and to compel the axis of said cartridge to pass through said axis I. These rotors will be advantageously carried between side plates 15 extending upwardly at the front of frame 4. They will guide the belt extracted from the box 5 that is being emptied as shown by FIGURE 3. They are interconnected by pinions 16 and 17 both of the same radius in order to rotate constantly at the same speed.

In the example illustrated by the drawing each of these rotors is provided with a number $n$ of teeth (equal to 5) whereas each of the cartridge boxes is supposed to contain a number N of cartridges (equal to 25).

In order to ensure the displacement of boxes 5 by the pull exerted on the belt during firing by the gun belt feed mechanism, I interpose, between the axis of rotor 14 and the axes of front pinions 8 upon which chains 7 are mounted, a gear connection such that both chains move forward simultaneously a distance equal to the length of a box whereas the rotors make $N/n$ revolutions, that is to say 5 revolutions. Thus, every box will be emptied during a displacement thereof equal to its length, region Z thus having a length equal to twice that of a box.

This connection is obtained by providing, at one end of the axis of rotor 14, a small pinion 18 meshing with a toothed wheel 19 carried by one of the ends of an intermediate shaft 20. This shaft meshes in turn at either end thereof, through a toothed wheel 21, with a toothed wheel 22 fixed on the axis of one of the small pinions 8, whereby each of these two pinions 8 is thus directly driven under the effect of the pull exerted on the cartridge belt by the belt feed mechanism of the gun.

Preferably, I interpose an elastic connection between on the one hand shaft 20 and both of the toothed wheels 21, and, on the other hand, the coaxial toothed wheel 19 which meshes with small pinion 18. For this purpose, toothed wheel 19 is fixed on the free end of a torsion rod 23 extending over its whole length through a coaxial tube which constitutes the above mentioned shaft 20, the other end of said rod 23 being fixed to said tube. Thus toothed wheel 19 can move resiliently by rotation through a given angle (for instance 10°) on either side of a mean position with respect to tubular shaft 20 and to toothed wheels 21 carried by this shaft.

When torsion rod 23 is not twisted (that is to say when no pull is exerted on the belt by the belt feed mechanism) both of the wheels 21 are blocked with respect to side plates 15 whereas when torsion rod 23 is twisted through a predetermined minimum angle (measured between wheels 19 and 21), wheel 21 and therefore shaft 20 are free to rotate.

For this purpose, in the example shown, I provide through the peripheral portion of toothed wheel 21 which is close to toothed wheel 19 at least one hole in which is engaged a ball 24 of a diameter greater than the thickness of wheel 21.

The fixed external wall of the corresponding side plate 15, or rather as shown an annular piece 25 fixed thereto, is provided with a plurality of, for instance 18, conical recesses 26, distributed along a circle coaxial with shaft 20, these recesses being all at the same distance from their common axis as the hole which contains ball 24.

Toothed wheel 19 carries, on the side thereof opposite wheel 21, a cam 27 such that, as long as torsion rod 23 is not twisted, cam 27 pushes ball 24 into a recess 26, as shown by FIGURE 11 (which is the development of a partial section made along a cylinder), which blocks toothed wheel 21 whereas, when the torsion rod is twisted through a sufficient predetermined angle, cam 27 leaves ball 24 free to move out from the recess 26 in which it was engaged, thus releasing the mechanism.

Thus, as soon as the belt feed mechanism ceases to pull the cartridge belt, toothed wheels 21, and therefore also chains 7 and boxes 5 which rest through their edges 11 on these chains, are fixed in position, which prevents inertia from causing said boxes 5 further to advance.

Figure 7:
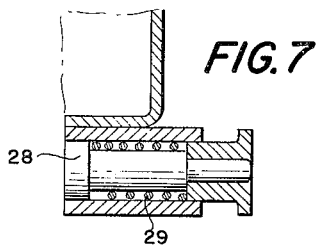
Figure 8:
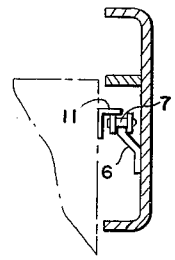
Figure 9:
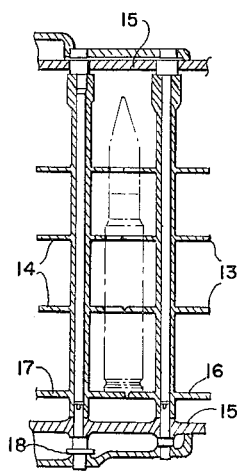

Besides, at least one retractable lug 28 (FIGS. 3 and 7) is advantageously provided at the lower end of at least one of the side faces of frame 4 so that when one of the boxes 5 is fitted in position, it forms a front abutment to stop the first box as soon as it has finished to penetrate fully into said region Z which is the region where the boxes 5 are to be emptied.

This lug 28 retracts spontaneously as soon as released under the thrust of a spring 29.

Anyway it will be understood that if, every time a box filled with cartridges is placed behind the train of boxes already formed on the chain, the portion of cartridge belt contained in this new box is connected through its front end to the rear end of the cartridge belt contained in the precediing box, displacement of the successive boxes will permit of ensuring the continuous feed of the gun without it being necessary to remove the successive belt portions from the boxes in which they have been brought and to handle these belt portions.

In order to guide toward the gun the cartridge belt as it leaves rotors 13 and 14 it is advantageous to have recourse to a guiding system constituting an indeformable arrangement pivoted to side plate 15 about axis I and capable of leading the cartridge belt toward the gun feed mechanism as soon as it leaves the space between rotors 13 and 14.

This system, which participates in the elevation aiming displacements of the gun, advantageously comprises the following tubular elements:

(a) First a rectilinear outlet passage 30 pivoted at its lower end, about axis I, to side plates 15;

(b) Then a first guide 31, twisted through 90°, to lead the cartridges leaving this guide to a rotor 32 placed in a casing 33 the axis IV of which is disposed in a plan parallel to the vertical plan of symmetry of the gun, said axis IV being perpendicular to the direction along which the cartridges travel in outlet passage 30; finally, (c) A second guide 34 leading from casing 33 to the inlet opening of the belt feed mechanism 35 of the gun, this guide 34 being twisted so that the cartridges, which leave rotor 32 with a displacement in a direction perpendicular to the vertical plan of symmetry of the gun (the cartridges being then parallel to said axis IV and being inclined with respect to the firing axis of the gun) are caused to come, when leaving said guide 34, into the correct position (parallel to the axis of firing of the gun) so as directly to enter the inlet opening of belt feed mechanism 35.

Of course, the boxes may be of any construction whatever provided that while being of the required dimensions they are provided externally on their side walls with the above mentioned edges 11 as above explained.

According to the embodiment shown by the drawings, these boxes have a parallelepipedal shape and are open at their upper end where may be applied a lid 36 which is kept in position by closing member 37 pivoted to said closing member and adapted to engage in the above mentioned notches 12.

On the inside of the box there may be provided a vertical partition 38, and in the front and rear edges of the opening of the boxes, supporting means 39 for the front and rear ends of the cartridge belt portion to be housed in said box.

If it is supposed that a single partition 38 is provided and that the belt portion housed in the box is to carry 25 cartridges the box is advantageously made as illustrated by FIGURE 13.

In this case the last cartridge 40 of the cartridge belt portion rests upon the rear supporting means 39 at the top of the inner face of the rear wall of the box. The belt then extends downwardly to the bottom of the box, then upwardly at the rear of partition 38 until it passes above the top edge 41 of said partition. Then the belt again extends downwardly to the bottom of the box, on the front side of partition 38, and upwardly along the inner face of the front wall of the box, the first cartridge 42 of said belt portion being secured to the front supporting means 39. Supporting means 39 are advantageously each constituted by a finger (also called 39 on the drawings) hinged to a support 43 fixed to the top of the inner side of the front (or rear) wall of the box, in such manner as to comply with the following conditions:

(1) Said finger 39 normally occupies a horizontal position, extending toward the inside of the box, below which position it cannot move down, this position being shown by FIG. 13 and, in solid lines, by FIGS. 16 and 17; in this position finger 39 can support one of the end cartridges, either the rear one 40 or the front one 42;

(2) But it may retract upwardly, as shown in dot-and-dash lines in FIGS. 16 and 17, when either the cartridge located before the last cartridge 40 or the cartridge located after the first cartridge 42 is lifted during the operation.

On each of the front and rear walls of every box, two such fingers 39 are provided so as to cooperate either with the front (FIGURE 17) or with the rear (FIG. 16) of the cartridge belt portion.

When it is desired to connect the rear cartridge 40 of one box to the front cartridge 42 of the next box, both boxes being juxtaposed to each other, it suffices to pivot link 44 (FIG. 13), which is to connect these two cartridges together, about that of these cartridges which carries this link, one of the hooks 45 of which (FIG. 13) has remained empty. It is then possible to bring, through a pressure which will be supported by the fingers 39 in question, the empty hook 45 into engagement with the other cartridge, whereby the two cartridge belt portions will be connected together.

Thus fingers 39 play, in addition to the part of supports for the end of the cartridge belt portion in the box, that of bearing elements resisting the thrust that must be exerted to connect together two successive cartridge belt portions.

Of course, the cover 36 of boxes 5 advantageously comprises any resilient cushions such as 46 to fit in position in the box cartridges 40 and 42 and also the cartridge 47 which, in a box filled with cartridges, rests upon the upper edge 41 of partition 38.

In a general manner, while the above description discloses what are deemed to be practical and effiicent embodiments of the present invention, said invention is not limited thereto as there might be changes made in the arrangement, disposition and form of the parts without departing from the principle of the invention as comprehended within the scope of the appended claims.

What I claim is:

1. For use with an automatic gun making use of ammunition in the form of a cartridge belt and movably supported about a horizontal axis by a gun mount itself rotatable about a vertical axis with respect to a fixed support, an ammunition feed device which comprises, in combination, a plurality of boxes each containing a cartridge belt portion folded therein, means in each of said boxes for guiding the unwinding of the cartridge belt portion therein, a frame carried by the gun mount, two parallel rails belonging to said frame and extending along rectilinear paths perpendicular to said horizontal axis to support a row of said boxes placed in juxtaposition, means for connecting together the belt portions of two of said boxes juxtaposed to each other, pulling means operative by the firing of said gun for feeding thereto the belt portion from the first box of said row, at least one toothed rotor pivoted to said frame and adapted to mesh with said last mentioned belt portion, and an endless chain movably supported by said frame and operatively connected with said rotor so as to be driven by it for gradually moving said row of boxes along said frame in response to the operation of said pulling means and for expelling said first box from said frame when the whole of the belt portion therein has been extracted therefrom by said pulling means.

2. A feed device according to claim 1 wherein the cartridges of said belt portions are disposed, in said respective boxes, perpendicularly to said rails, further including means carried by said frame for twisting the belt portion on its way from said first box to said gun to bring the cartridges of said belt portion into line with the axis of firing of the gun.

3. For use with an automatic gun making use of ammunition in the form of a cartridge belt and movably supported by a gun mount itself movable with respect to a support, an ammunition feed device which comprises, in combination, a plurality of boxes each containing a cartridge belt portion folded therein, means in each of said boxes for guiding the unwinding of the cartridge belt portion therein, a frame carried by the gun mount and adapted slidably to support a row of said boxes placed in juxtaposition, means for connecting together the belt portions of two of said boxes juxtaposed to each other, pulling means operative by the firing of said gun for feeding thereto the belt portion from the first box of said row, means operative by the firing of said gun for gradually moving said row of boxes along said frame in response to the operation of said pulling means and for expelling said first box from said frame when the whole of the belt portion therein has been extracted therefrom by said pulling means, and means for automatically locking said row of boxes with respect to said frame in response to said last mentioned means being inoperative, that is to say when said gun is not firing.

4. For use with an automatic gun making use of ammunition in the form of a cartridge belt and movably supported by a gun mount itself movable with respect to a support, an ammunition feed device which comprises, in combination, a plurality of boxes each containing a cartridge belt portion folded therein, means in each of said boxes for guiding the unwinding of the cartridge belt portion therein, a frame carried by the gun mount and adapted slidably to support a row of said boxes placed in juxtaposition, means for connecting together the belt portions of two of said boxes juxtaposed to each other, pulling means operative by the firing of said gun for feeding thereto the belt portion from the first box of said row, means operative by the firing of said gun for gradually moving said row of boxes along said frame in response to the operation of said pulling means and for expelling said first box from said frame when the whole of the belt portion therein has been extracted therefrom by said pulling means, said last mentioned means comprising yielding coupling means, means for locking said row of boxes with respect to said frame, and means responsive to deformation of said yielding coupling means for bringing said locking means out of action in response to a minimum deformation of said yielding coupling means.

5. An ammuntion feed device for an automatic gun, said feed device comprising in combination a plurality of boxes each containing a cartridge belt portion folded therein, means in each of said boxes for guiding the unwinding of the cartridge belt portion therein, a frame adapted to be attached to a gun mount of said automatic gun, said frame adapted to slidably support at least one row of said boxes placed in juxtaposition, means for connecting together adjacent ends of the respective belt portions of said juxtaposed boxes to form one continuous belt, means for feeding the belt portion from the first box of said row to said gun, the feeding means being controlled by the firing of said gun, and means mechanically coupled to said boxes for gradually moving said row of boxes in a forward direction as the belt portion is removed from said first box, said means for moving being powered by the firing of said gun and operating to move said row of boxes from extraction of the first cartridge within said first box until the last cartridge is extracted therefrom, said means for moving being also provided for expelling said first box from said frame when the belt portion has been removed therefrom by said feeding means, whereby the relation between the movement of said first box and the belt portion being extracted therefrom is controlled to place the box juxtaposed to said first box in position for extraction of its belt portion as said first box is extracted.

6. An automatic feed device for an automatic gun, the automatic gun being movably supported about an horizontal axis by a gun mount rotatable about a vertical axis with respect to a fixed support, said feed device comprising in combination a plurality of boxes each containing a cartridge belt portion folded therein, a frame adapted to be attached to said gun mount of said automatic gun, said frame adapted to slideably support, along a rectilinear path fixed with respect to said gun mount and perpendicular to said horizontal axis, at least one row of said boxes placed in juxtaposition, means for connecting together adjacent ends of the respective belt portions of said juxtaposed boxes to form one continuous belt, means for feeding the belt portion from the first box of said row to said gun, the feeding means being controlled by the firing of said gun, and means mechanically coupled to said boxes for gradually moving said row of boxes in a forward direction as the belt portion is removed from said first box, said means for moving being powered by the firing of said gun and operating to move said row of boxes from extraction of the first cartridge within said first box until the last cartridge is extracted therefrom, said means for moving being also provided for expelling said first box from said frame when the belt portion has been removed therefrom by said feeding means, whereby the relation between the movement of said first box and the belt portion being extracted therefrom is controlled to place the box juxtaposed to said first box in position for extraction of its belt portion as said first box is extracted.

References Cited by the Examiner

UNITED STATES PATENTS 1,901,868  3/1933  Dabrasky _____ 89—33

FOREIGN PATENTS 783,765  7/1935  France.

BENJAMIN A. BORCHELT, *Primary Examiner.*

FRED C. MATTERN, Jr., *Examiner.*